United States Patent
Sollami et al.

(10) Patent No.: US 11,373,343 B2
(45) Date of Patent: Jun. 28, 2022

(54) SYSTEMS AND METHODS OF GENERATING COLOR PALETTES WITH A GENERATIVE ADVERSARIAL NETWORK

(71) Applicant: salesforce.com, inc., San Francisco, CA (US)

(72) Inventors: Michael Sollami, Cambridge, MA (US); Amir Hossein Raffiee, Cambridge, MA (US); Owen Winne Schoppe, Orinda, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/091,259

(22) Filed: Nov. 6, 2020

(65) Prior Publication Data

US 2022/0148232 A1    May 12, 2022

(51) Int. Cl.
  *G06T 7/90*      (2017.01)
  *G06T 11/00*     (2006.01)
  *G06K 9/62*      (2022.01)
  *G06V 10/75*     (2022.01)

(52) U.S. Cl.
  CPC .......... *G06T 11/001* (2013.01); *G06K 9/6218* (2013.01); *G06K 9/6256* (2013.01); *G06T 7/90* (2017.01); *G06V 10/751* (2022.01); *G06T 2207/10024* (2013.01); *G06T 2207/20081* (2013.01); *G06T 2207/20084* (2013.01)

(58) Field of Classification Search
  CPC .................... G06T 11/001; G06T 7/90; G06T 2207/10024; G06T 2207/20081; G06T 2207/20084; G09G 5/06; G06N 3/02; G06N 7/046; G06K 9/6202; G06K 9/6218; G06K 9/6256
  See application file for complete search history.

(56) References Cited

U.S. PATENT DOCUMENTS

2019/0304008 A1* 10/2019 Cen ................... G06Q 30/0629
2019/0355155 A1* 11/2019 Shugrina ............... G06T 11/001

OTHER PUBLICATIONS

"Generating color palettes"—colormind.io accessed via web @ http://colormind.io/blog/generating-color-palettes-with-deep-learning/ on Nov. 24, 2021. First seen on web (via wayback machine) Feb. 25, 2017. pp. 1-2 (Year: 2017).*

(Continued)

*Primary Examiner* — Antonio A Caschera
(74) *Attorney, Agent, or Firm* — Butzel Long

(57) ABSTRACT

Generating, at a server of a generative adversarial network (GAN) for color selection, a training set of color palettes. A color palette generator of the server generates a first set of color palettes based on the training set of color palettes. The first set of color palettes may be compared with a reference set of color palettes to predict a curated set of color palettes. Colors from the curated set of color palettes may be removed that are within a predetermined distance from one another in a color space. The GAN may be validated by performing cluster analysis to determine outlier latent dimensions to be changed for the color selection by the GAN. Proposed color palettes may be generated based on the GAN to be displayed on a display device.

10 Claims, 8 Drawing Sheets

(56) References Cited

OTHER PUBLICATIONS

Kim et al. "GAN-based Color Palette Extraction System by Chroma Fine-tuning with Reinforcement Learning" Journal of Semiconductor Engineering vol. 2, Issue 1, Mar. 2021. pp. 125-129 (Year: 2020).*
Vitoria et al., "ChromaGAN: Adversarial Picture Colorization with Semantic Class Distribution", arXiv:1907.09837v2 (cs.CV) Jan. 20, 2020, 10 pages.
Yang et al., "Semantic Hierarchy Emerges in Deep Generative Representations for Scene Synthesis", arXiv:1911.09267v3 (cs.CV) Feb. 11, 2020, 15 pages.
Das et al., "Color Constancy by GANs: An Experimental Survey", arXiv:1812.03085v1 (cs.CV) Dec. 7, 2018, 11 pages.
Kim et al., "Tag2Pix: Line Art Colorization Using Text Tag with SECat and Changing Loss", arXiv:1908.05840v1 (cs.CV) Aug. 16, 2019, 19 pages.
Cao et al., "Unsupervised Diverse Colorization via Generative Adversarial Networks", arXiv:1702.06674v2 (cs.CV) Jul. 1, 2017, 16 pages.

* cited by examiner

SYSTEMS AND METHODS OF GENERATING COLOR PALETTES WITH A GENERATIVE ADVERSARIAL NETWORK

BACKGROUND

Designers frequently spend many hours selecting a group of colors that work together according to their aesthetic judgment. In some cases, they need a certain number of colors that work together. In other cases, they already have several colors and need to add more to the set. Classical color theory can be used to generate new colors, analogous colors, complementary colors, or the like, but typically such theory does not work in all situations and for an arbitrary number of colors. Electronic color wheels can be used to propose colors when a user selects a color harmony rule (e.g., analogous colors, monochromatic colors, complementary colors, split contemporary colors, double split contemporary colors, square colors, compound colors, shades, and the like).

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1:
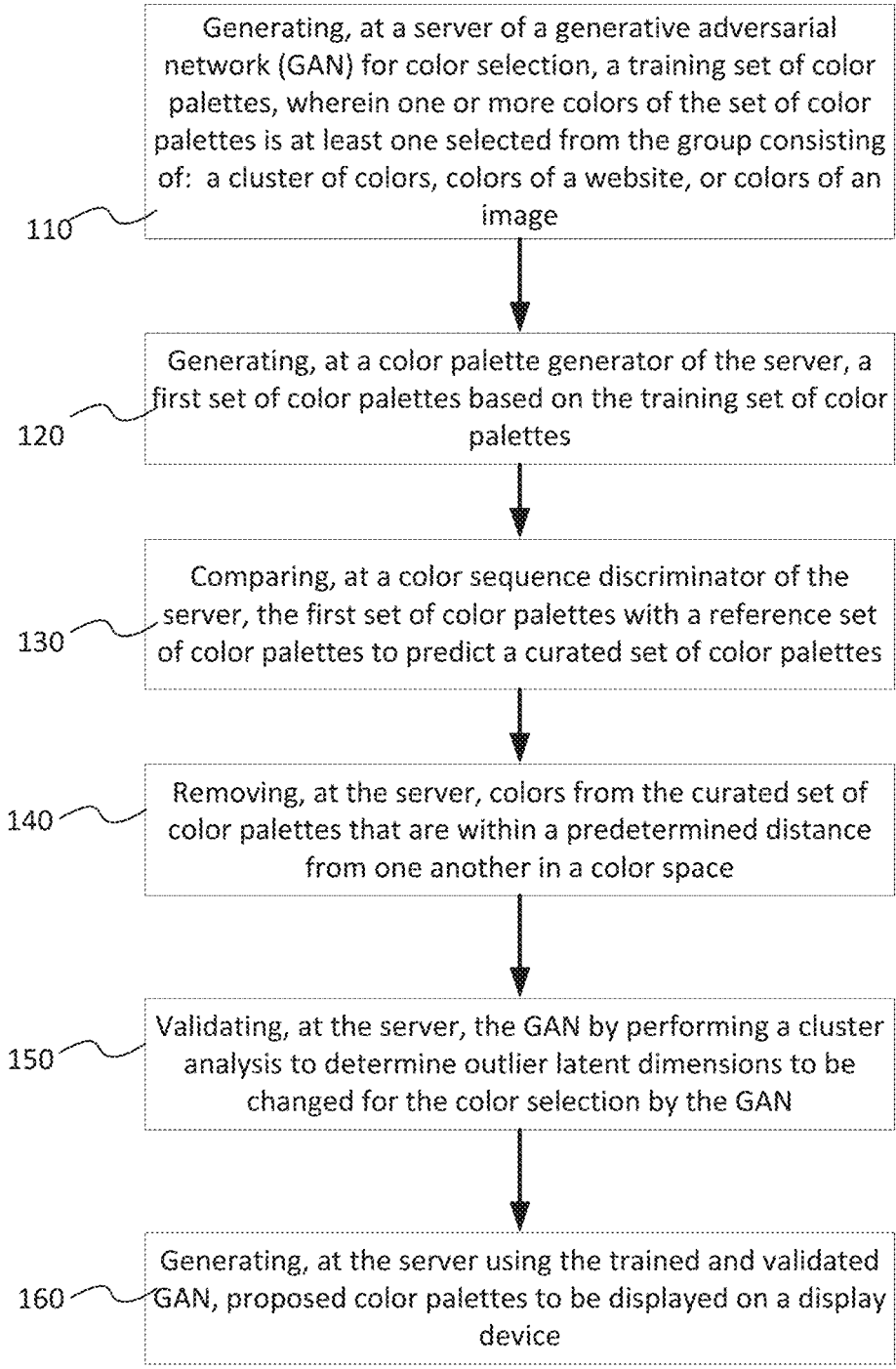
FIGS. 1-2 show an example method of training a generative adversarial network (GAN) for color selection and generating proposed color palettes according to an implementation of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Color palettes are used in design for a variety of use cases. Implementations of the disclosed subject matter may be used to determine appropriate color palettes for user experience (UX) and/or user interfaces (UI) of applications. The disclosed subject matter may generate suggested color palettes for such applications. In some implementations, color palette refinement may be provided so that a user may adjust color palettes over dimensions of a color space (e.g., lightness, hue, balance, and the like). Implementations of the disclosed subject matter may provide for palette completion, where colors may be suggested that are harmonious to one another.

For applications such as icon background colors, chart coloring, map coloring, calendar event coloring, and the like, a large number of colors are needed. Typically, designers may spend many hours selecting a group of colors that work together according to their aesthetic judgment. In some cases, they need a certain number of colors that work together. In other cases, several colors may already be selected, and more colors may need to be added to the set.

Present color scheme generators use fixed rules based on classical color theory to generate new colors, analogous colors, complementary colors, triad colors, and the like. However, such present color scheme generators may not work in all color generation situations, and for an arbitrary number of colors. Implementations of the disclosed subject matter generate a proposed set of colors based on a current distribution of colors (e.g., from a cluster of colors, colors used in a website, colors used in an image, or the like), rather than a fixed rule or strategy. This allows an arbitrary number of colors to be generated that work well together. Implementations of the disclosed subject matter may extend any set of existing colors with one or more additional colors. By determining the aesthetic pattern in the existing colors, implementations of the disclosed subject matter may reduce the time to create new colors for use in a user interface and/or user experience of an application.

Figure 2:
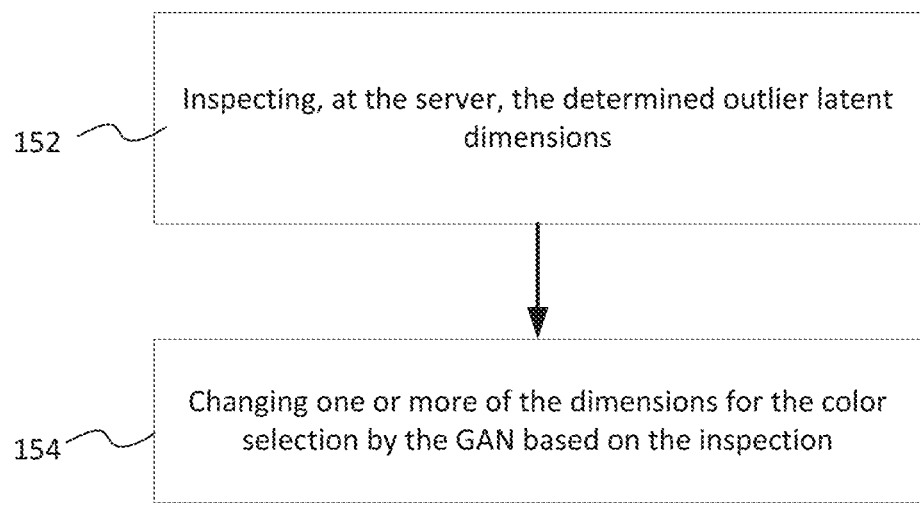

FIGS. 1-2 show an example method 100 of training a generative adversarial network (GAN) for color selection and generating proposed color palettes according to an implementation of the disclosed subject matter. At operation 110, a server (e.g., server 700 shown in FIG. 7) of a generative adversarial network (GAN) for color selection may generate a training set of color palettes. One or more colors of the set of color palettes may be a cluster of colors, colors of a website, colors of an image, or the like.

Figure 3A:
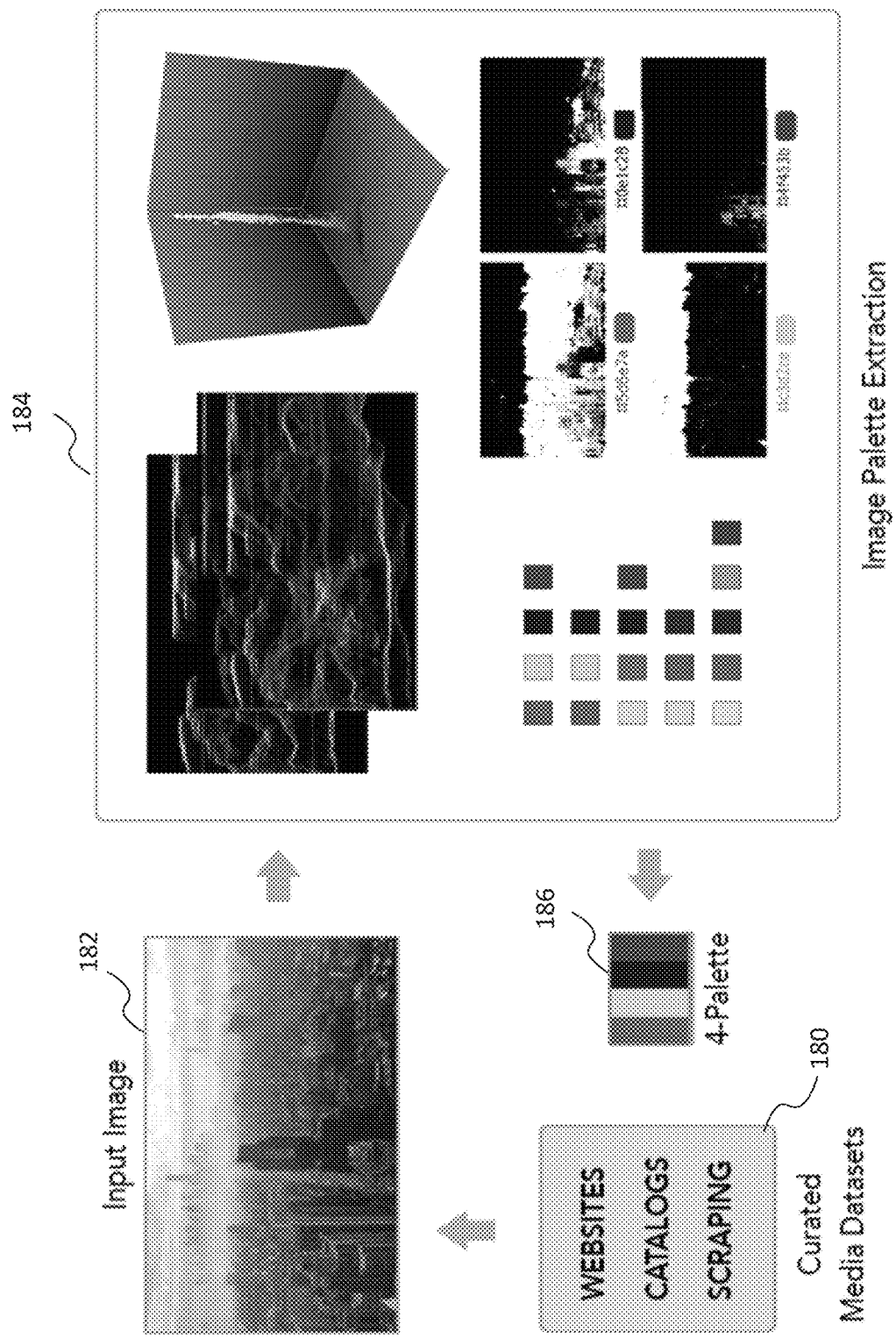
FIG. 3A shows generating color palettes to train the GAN according to an implementation of the disclosed subject matter.

For example, FIG. 3A shows generating color palettes to train the GAN according to an implementation of the disclosed subject matter. A curated media dataset 180 may be used to generate the set of training color palettes to train the GAN. The curated media dataset 180 may include one or more websites, electronic catalogs, and/or scraped colors (e.g., where the colors are scraped from one or more files, websites, catalogs, or the like). In some implementations, one or more images 182 may be used by the server to extract colors from as shown by image palette extraction 184. One or more of the colors from the curated media datasets 180, the input image 182, and/or the image palette extraction 184 may be used to form a color palette 186.

Although a four color palette is shown in FIG. 3A, the color palette 186 may be of any size from 1 to n. Each color palette of a particular length may include the most representative colors from the images from which the colors are extracted. Operation 110 may be used to curate a training set of color palettes of length n, where the size of the color palettes may be, for example, 1<n<20.

Figure 3B:
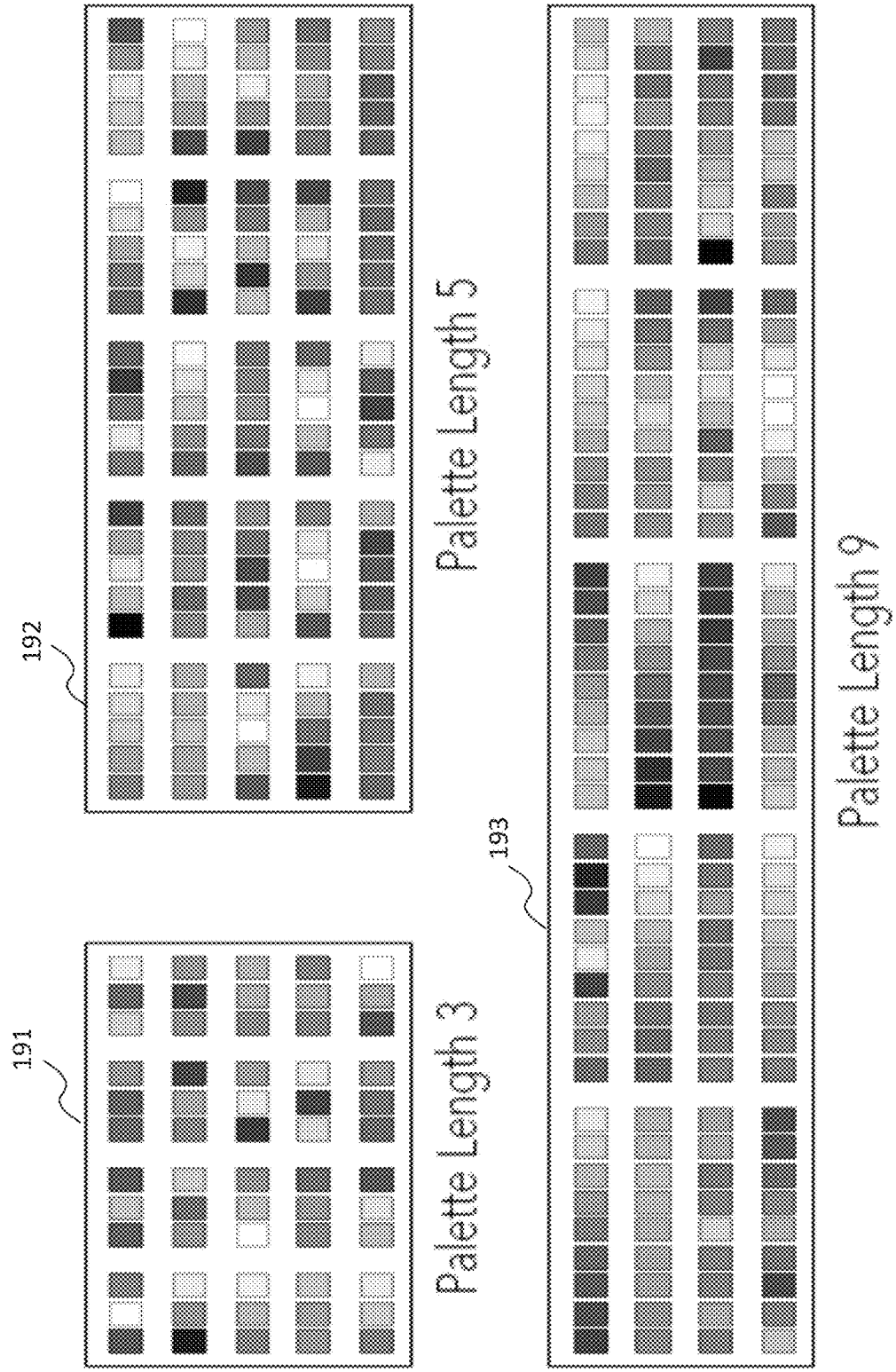
FIG. 3B shows example training color palettes from the image palette extraction shown in FIG. 3A according to an implementation of the disclosed subject matter.

The length of color palette may be different for each image, based on the colors extracted from each image. Balanced sets of color palettes of different lengths may be generated from the image palette extraction. For example, FIG. 3B shows training color palettes 190 from the image palette extraction shown in FIG. 3A. Palettes 191 may include example palettes with a length of three, palettes 192 may include example palettes with a length of five, and example palettes 193 may include example palettes with a length of nine. The example training color palettes 190 (e.g., palettes 191, 192, and/or 193) are example lengths, and the training color palettes 190 may be of any size from 1 to n.

Figure 4:
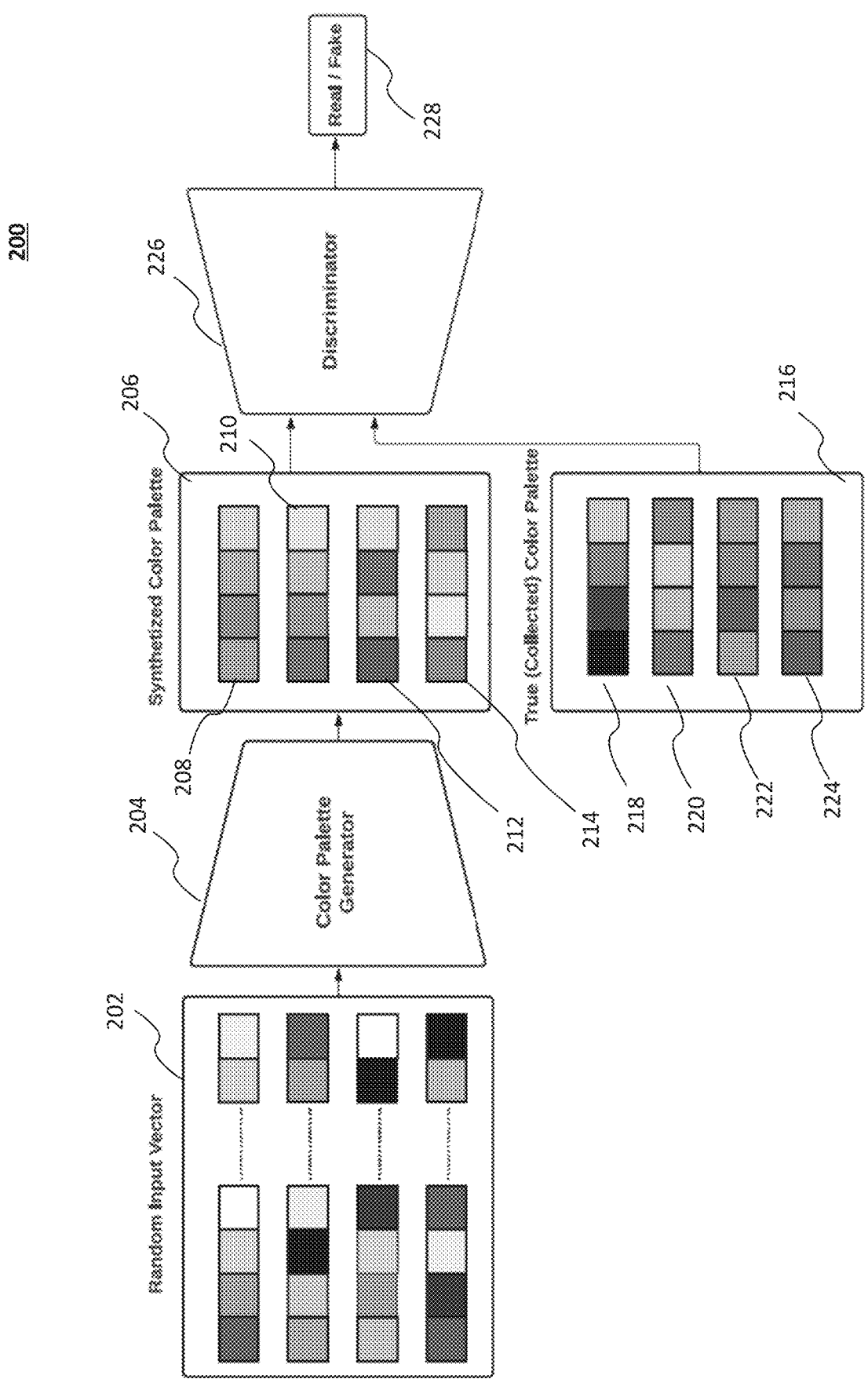
FIG. 4 shows an example of training the GAN for color selection according to an implementation of the disclosed subject matter.

At operation 120, a color palette generator (e.g., color palette generator 204 shown in FIG. 4) of the server may generate a first set of color palettes based on the training set of color palettes. FIG. 4 shows an implementation of system 200, where a random input vector 202 may be provided to a color palette generator 204. The random input vector 202 may be used by the color palette generator 204 to generate different color palettes. The color palette generator 204 may generate the synthesized color palette 206 (e.g., the first set of color palettes), which may include one or more color palettes, such as color palettes 208, 210, 212, and/or 214.

At operation 130, a color sequence discriminator (e.g., discriminator 226 shown in FIG. 4) of the server may compare the first set of color palettes (e.g., synthesized color palette 206 shown in FIG. 4) with a reference set of color palettes (e.g., true color palettes 216 shown in FIG. 4) to predict a curated set of color palettes. As discussed below, the discriminator 226 may predict whether a set of color palettes are from the true color palette 216 or are generated by the color palette generator 204.

The synthesized color palette 206 may be compared to a true color palette 216 by the discriminator 226. The true color palette 216 may be a reference color palette, and may include color palettes 218, 220, 222, and/or 224. The true color palette 216 may include colors that are determined to be desirable, as they may be harmonious, complementary, or the like. The discriminator 226 may output a determination result 228 (e.g., real/fake, desirable/undesirable, or the like) of the comparison between the synthesized color palettes 206 and the true color palettes 216. That is, each of the color palettes (e.g., color palettes 208, 210, 212, and/or 214) generated by the color palette generator 204 may be compared to the color palettes 218, 220, 222, and/or 224 of the true color palette 216 by the discriminator to determine whether the synthesized color palette includes desirable colors such as those in the true color palette 216.

At operation 140, the server may remove colors from the curated set of color palettes that are within a predetermined distance from one another in a color space. A color space may include, for example, RBG (Red Green Blue), CMYK (Cyan Magenta Yellow Black), CIELAB, and/or CIEXYZ color spaces, or the like. The server may remove such colors that are within the predetermined distance so that the resulting curated set of colors may have colors that are distinct from one another, rather than having one or more colors that may be subtle variations of one another. For example, each color in a color space may be represented as tuples of numbers (e.g., triples in RGB, quadruples in CMYK, or the like). The server may remove colors that have tuple values that are within a predetermined range of one another.

An activation function may define the output of a node of the GAN given an input or set of inputs. For example, a tanh activation function $$f(x) = \tanh(x) = \frac{(e^x - e^{-x})}{(e^x + e^{-x})}$$

may be used to truncate the range (e.g., from 0-n, from 0-1, or the like) for training the GAN so as to reduce the amount of computation by the server.

At operation 150, the server may validate the GAN by performing a cluster analysis to determine outlier latent dimensions to be changed for the color selection by the GAN. The server may validate the GAN by performing a cluster analysis to determine outlier latent dimensions to be changed for the color selection by the GAN. The server may determine a cluster of colors proposed by the GAN in a cluster map, and may determine which proposed colors are outlier colors based on the cluster map. The GAN may be trained so as to remove and/or reduce the outlier colors. In some implementations, as the cluster map may identify the range of tuple values of colors for a color space that are clustered together. The cluster may be used to determine what changes should be made in training the GAN, such as changing the curated media datasets, and/or changing attributes such as hue, saturation, brightness, color temperature, and the like.

FIG. 2 shows example operations of the validation operation 150 according to an implementation of the disclosed subject matter. At operation 152, the server may inspect the determined outlier latent dimensions. For example, as described above, the server may determine the outlier dimensions by generating cluster maps, and may adjust the training of the GAN based on the outlier dimensions. At operation 154, the server may change one or more of the dimensions for the color selection by the GAN based on the inspection. For example, the server may change attributes such as hue, saturation, brightness, color temperature, and the like.

Figure 5:
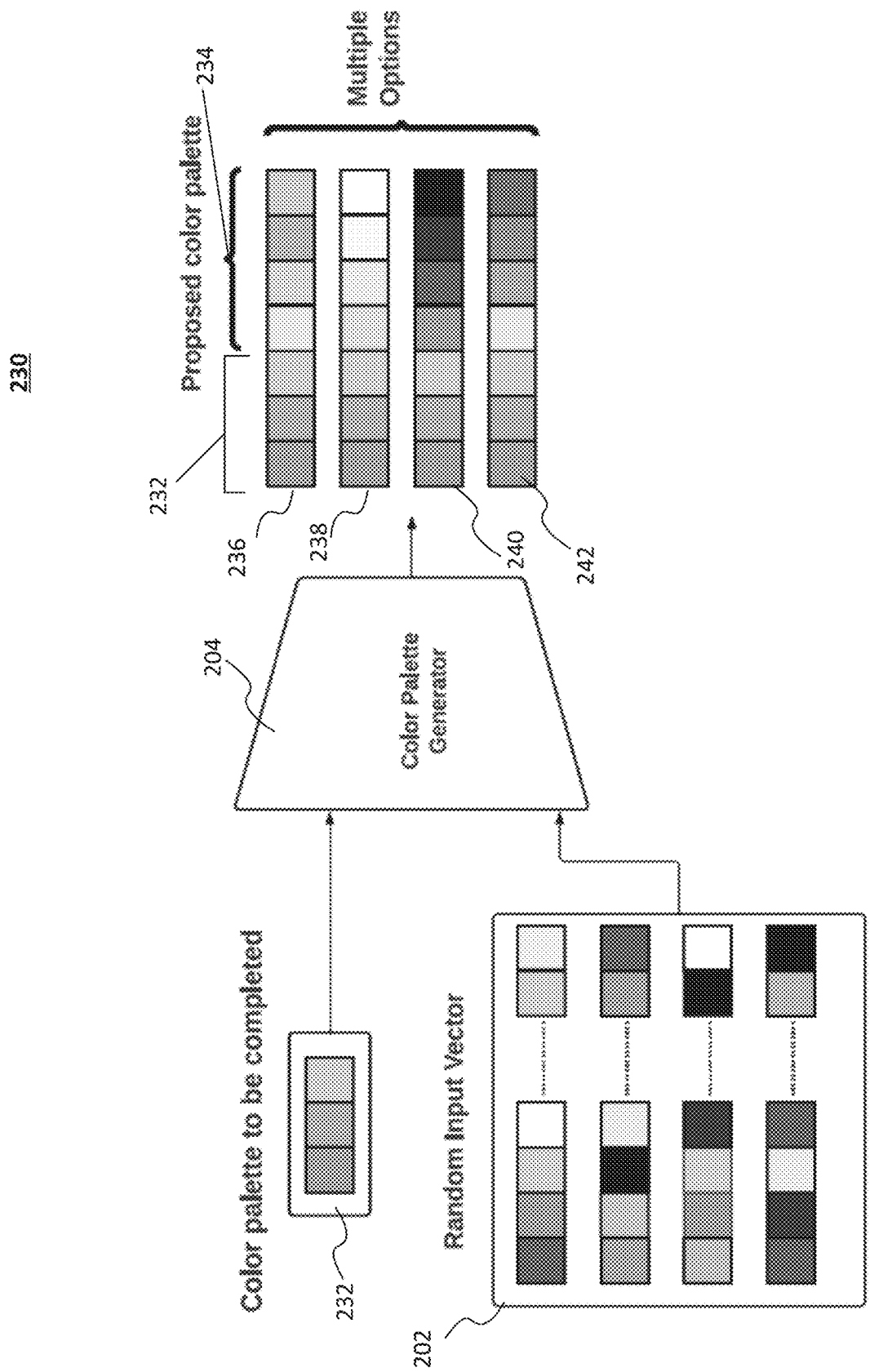
FIG. 5 shows an example of generating proposed color palettes using an input color palette to be completed according to an implementation of the disclosed subject matter.
Figure 6:
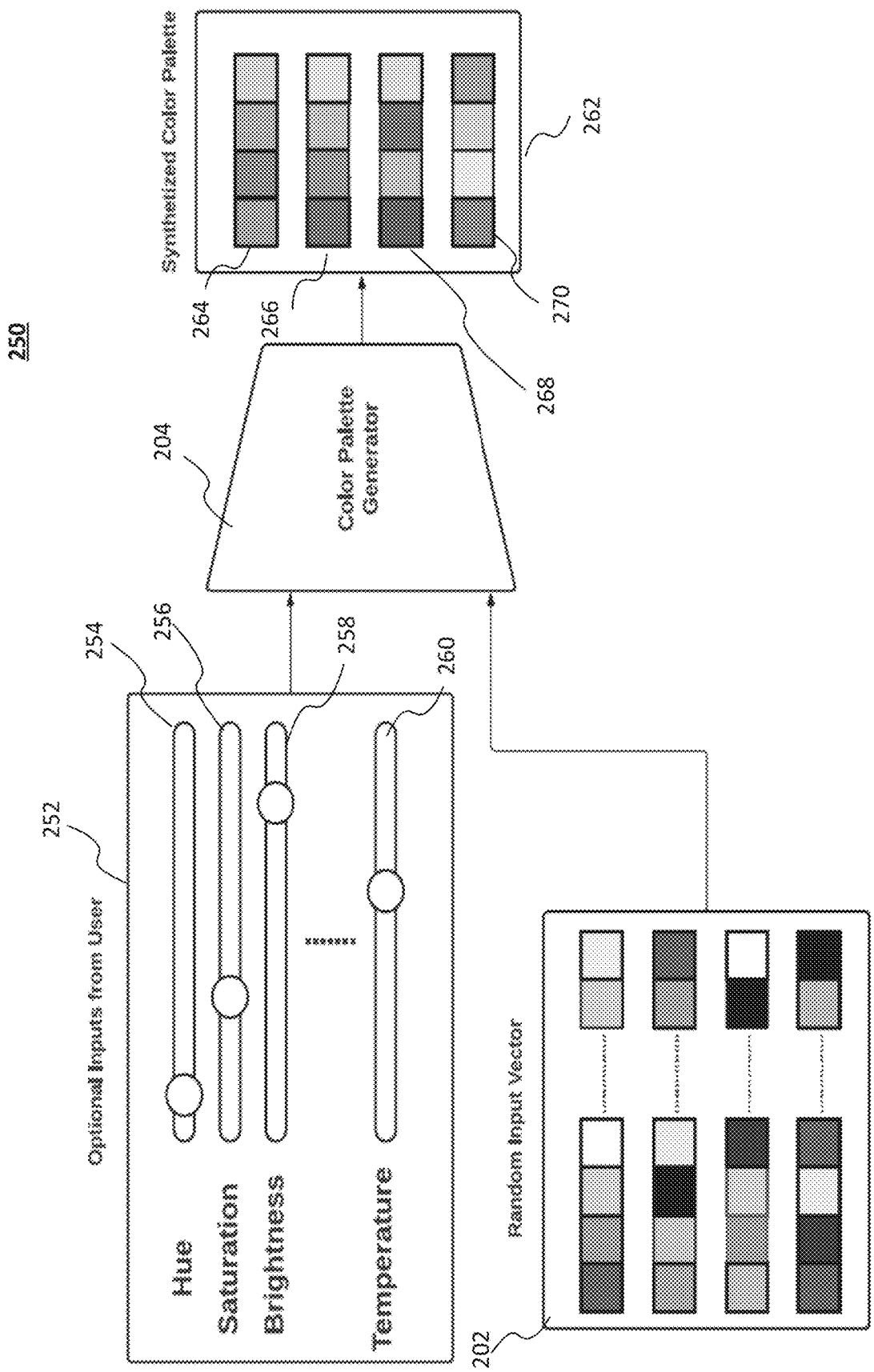
FIG. 6 shows an example of generating the proposed color palettes using inputs from a user according to an implementation of the disclosed subject matter.
Figure 7:
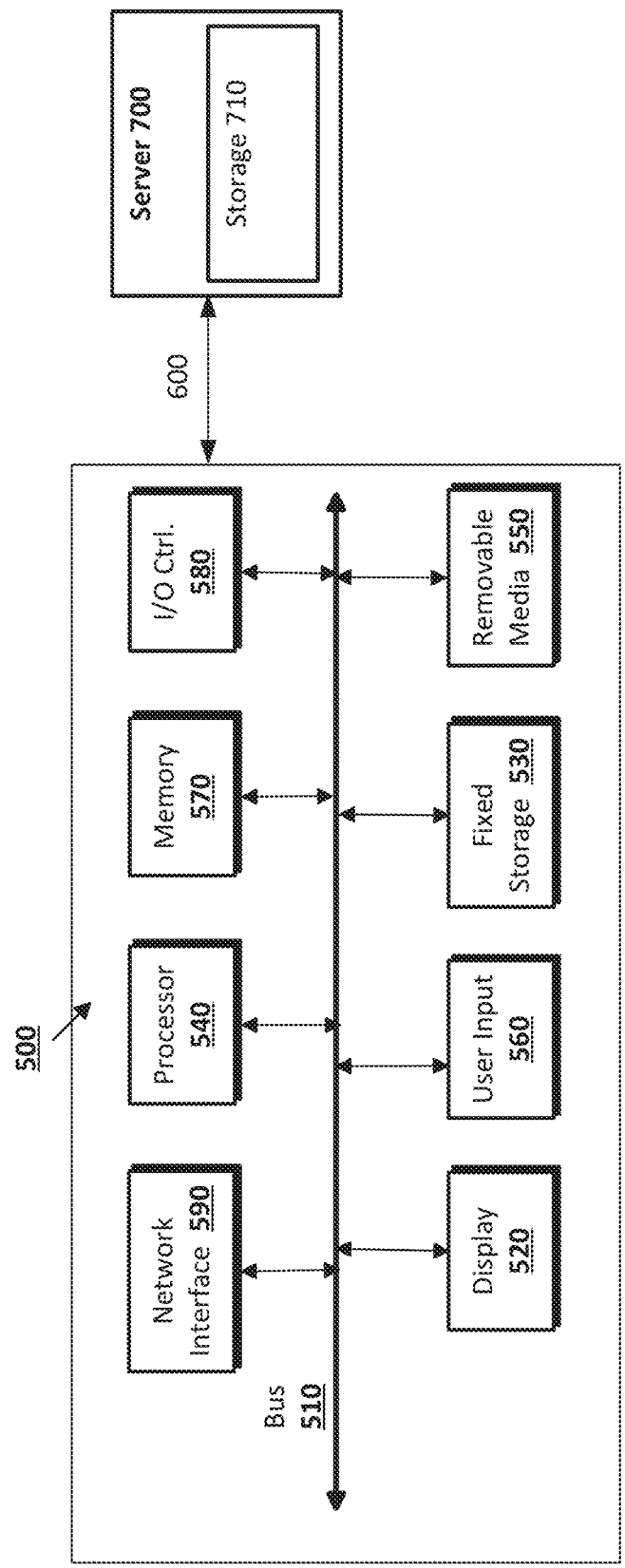
FIG. 7 shows a computer system according to an implementation of the disclosed subject matter.

At operation 160, the server may use the trained and validated GAN may generate proposed color palettes to be displayed on a display device (e.g., display 520 of computer 500 shown in FIG. 7). FIG. 5 shows a system 230 to generate, at the color palette generator 204, the proposed color palettes based on the color palette to be completed and random input color sequences. FIG. 6 shows a system 250 to generate the proposed color palettes based on at least one received color characteristic and random input color sequences.

For example, as shown in FIG. 5, a color sequence generator system 230 may include a color palette generator 204, which may generate one or more proposed color palettes (e.g., color palettes 236, 238, 240, and/or 242) based on a color palette 232 and one or more color input vectors 202. The color sequence generator system 230 may be part of server 700 shown in FIG. 7. The color palette 232 may be a color palette to be completed by the color palette generator 204 based on the color palette 232 and the color input vectors 202. The color input vectors 202 may be randomly formed by the server 700 from a selected color space which may be the same color space or a different color space than the colors of the color palette 232. The color palette 232 may be colors selected by a user and/or received by the server from a computer (e.g., computer 500 shown in FIG. 7). The color palette 232 may be an initial set of colors, and the color palette generator 204 may generate one or more colors that may be harmonious to the color palette 232 based on the initial colors of the color palette 232 and the color input vectors 202. That is, the color palette generator 204 may generate the color palettes 236, 238, 240, and/or 242 using the input vector 202, which may include randomly generated color palettes, combined with the color palette 232 to generate different proposed color palettes.

The proposed color palettes 236, 238, 240, and 242 may include the color palette 232, along with generated colors (e.g., generated colors 234). That is, the color palette 232 may be included in all of the proposed color palettes 236, 238, 240, and 242, but the other colors (e.g., generated colors 234) may be different for each of the proposed color palettes 236, 238, 240, and 242.

FIG. 6 shows an implementation of color sequence generator system 250, which may be similar to the system 230 of FIG. 5, but may include user inputs 252. For example, the user inputs 252 may adjust hue 254, saturation 256, brightness 258, color temperature 260, and the like as input to the color palette generator 204. User inputs 252 may be received from user input 560 of computer 500 shown in FIG. 7, and may be provided to the server. In some implementations, the color sequence generator system 250 may be part of server 700 shown in FIG. 7. The color input vectors 202 may be randomly formed by the server 700 from a selected color space. The color palette generator 204 may generate a synthesized color palette 262, which may include one or more proposed color palettes 264, 266, 268, and/or 270 based on user inputs 252 and input vector 202. The color input vectors 202 may be randomly formed by the server 700 from a selected color space.

The server may transmit the generated proposed color palettes of systems 230 and/or 250 to be displayed on a display device. For example, the server 700 shown in FIG. 7 may transmit the curated set of colors to computer 500 via a wired and/or wireless communications network 600. The computer 500 may display the curated set of colors on display 520. A user of the computer 500 may select one or more of the proposed color palettes that are desirable for use in an UX and/or UI application.

Implementations of the presently disclosed subject matter may be implemented in and used with a variety of component and network architectures. FIG. 7 is an example computer 500 suitable for the implementations of the presently disclosed subject matter. As discussed in further detail herein, the computer 500 may be a single computer in a network of multiple computers. In some implementations, the computer 500 may be used to request a generation of a product description, provide text, images, and/or attributes to be used to generate a product description, and/or display a generated product description. As shown in FIG. 7, the computer 500 may communicate with a server 700 (e.g., a server, cloud server, database, cluster, application server, neural network system, or the like) via a wired and/or wireless communications network 600. The server 700 may include a storage device 710. The storage 710 may use any suitable combination of any suitable volatile and non-volatile physical storage mediums, including, for example, hard disk drives, solid state drives, optical media, flash memory, tape drives, registers, and random access memory, or the like, or any combination thereof.

The storage 710 of the server 700 can store data, such as website data, data scraped from websites, electronic product catalogs, images, color palettes, and the like. Further, if the server 700 and/or storage 710 is a multitenant system, the storage 710 can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 9 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

In some implementations, the server shown in FIG. 9 can store the data (e.g., color palettes, electronic product catalogs, website data, scraped data, and the like) in the immutable storage of the at least one storage device (e.g., storage 710) using a log-structured merge tree data structure.

The systems and methods of the disclosed subject matter can be for single tenancy and/or multitenancy systems. Multitenancy systems can allow various tenants, which can be, for example, developers, users, groups of users, and/or organizations, to access their own records (e.g., tenant data and the like) on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multitenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, a log structured merge (LSM) tree.

Further, a multitenant system can have various tenant instances on server systems distributed throughout a network with a computing system at each node. The live or production database instance of each tenant may have its transactions processed at one computer system. The computing system for processing the transactions of that instance may also process transactions of other instances for other tenants.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "comparing," "removing," "training," "validating," "inspecting," "changing," "outputting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
   generating, at a server of a generative adversarial network (GAN) for color selection, a training set of color palettes, wherein one or more colors of the set of color palettes is at least one selected from the group consisting of: a cluster of colors, colors of a website, or colors of an image;
   generating, at a color palette generator of the server, a first set of color palettes based on the training set of color palettes;
   comparing, at a color sequence discriminator of the server, the first set of color palettes with a reference set of color palettes to predict a curated set of color palettes;
   removing, at the server, colors from the curated set of color palettes that are within a predetermined distance from one another in a color space;

validating, at the server, the GAN by performing a cluster analysis to determine outlier latent dimensions to be changed for the color selection by the GAN; and generating, at the server using the validated GAN, proposed color palettes to be displayed on a display device.

2. The method of claim 1, wherein the validating further comprises:

inspecting, at the server, the determined outlier latent dimensions; and changing one or more of the dimensions for the color selection by the GAN based on the inspection.

3. The method of claim 2, wherein the inspecting the determined outlier latent dimensions further comprises:

generating, at the server, cluster maps to determine the outlier dimensions.

4. The method of claim 1, wherein the generating the proposed color palettes further comprises:

generating, at the color palette generator, the proposed color palettes based on a color palette to be completed and random input color sequences.

5. The method of claim 1, wherein the generating the proposed color palettes further comprises:

generating, at the color palette generator, the proposed color palettes based on at least one received color characteristic and random input color sequences, wherein the at least one received color characteristic is selected from the group consisting of: hue, saturation, brightness, or color temperature.

6. A system comprising:

a server having a processor and a memory to store a generative adversarial network (GAN) for color selection to:

generate, at a server of a generative adversarial network (GAN) for color selection, a training set of color palettes, wherein one or more colors of the set of color palettes is at least one selected from the group consisting of: a cluster of colors, colors of a website, or colors of an image;

generate, at a color palette generator of the server, a first set of color palettes based on the training set of color palettes;

compare, at a color sequence discriminator of the server, the first set of color palettes with a reference set of color palettes to predict a curated set of color palettes;

removing, at the server, colors from the curated set of color palettes that are within a predetermined distance from one another in a color space;

validate, at the server, the GAN by performing a cluster analysis to determine outlier latent dimensions to be changed for the color selection by the GAN; and generate, at the server using the validated GAN, proposed color palettes to be displayed on a display device.

7. The system of claim 6, wherein the server validates the GAN by inspecting the determined outlier latent dimensions, and changing one or more of the dimensions for the color selection by the GAN based on the inspection.

8. The system of claim 7, wherein the server inspects the determined outlier latent dimensions by generating cluster maps to determine the outlier dimensions.

9. The system of claim 6, wherein the color palette generator generates the proposed color palettes based on a color palette to be completed and random input color sequences.

10. The system of claim 6, wherein the color palette generator generates the proposed color palettes based on at least one received color characteristic and random input color sequences, and wherein the at least one received color characteristic is selected from the group consisting of: hue, saturation, brightness, or color temperature.

* * * * *